US011921024B2

(12) United States Patent
Weinroth (10) Patent No.: US 11,921,024 B2
(45) Date of Patent: Mar. 5, 2024

(54) AIRBORNE PARTICULATE DENSITY DETERMINATION USING STANDARD USER EQUIPMENT

(71) Applicant: Mobile Physics Ltd., Kfar Saba (IL)

(72) Inventor: Erez Weinroth, Kfar Saba (IL)

(73) Assignee: Mobile Physics Ltd., Kfar Saba (IL)

( * ) Notice: Subject to any disclaimer, the term of this patent is extended or adjusted under 35 U.S.C. 154(b) by 413 days.

(21) Appl. No.: 17/355,713

(22) Filed: Jun. 23, 2021

(65) Prior Publication Data

US 2021/0318221 A1    Oct. 14, 2021

Related U.S. Application Data (63) Continuation of application No. PCT/IL2019/051402, filed on Dec. 24, 2019.

(Continued)

(51) Int. Cl.
*G01N 15/06* (2006.01)
*G01N 21/53* (2006.01)
*G01N 15/00* (2006.01)

(52) U.S. Cl.
CPC .......... *G01N 15/06* (2013.01); *G01N 21/53* (2013.01); *G01N 2015/0038* (2013.01); *G01N 2015/0046* (2013.01); *G01N 2015/0693* (2013.01)

(58) Field of Classification Search
CPC .......... G01N 15/06; G01N 21/53; G01N 2015/0038; G01N 2015/0046; G01N 2015/0693
See application file for complete search history.

(56) References Cited

U.S. PATENT DOCUMENTS 9,677,986 B1    6/2017  Baldwin et al.
2011/0320124 A1*  12/2011  Al-Ruwais ........... G01N 21/538
                                                 250/338.5

(Continued)

FOREIGN PATENT DOCUMENTS

EP      2595130        5/2013
WO   WO 2008/056444    5/2008

OTHER PUBLICATIONS

International Search Report and Written Opinion for PCT Application No. PCT/IL2019/051402, dated Apr. 22, 2020.

(Continued)

*Primary Examiner* — Jonathan M Hansen
(74) *Attorney, Agent, or Firm* — PEARL COHEN ZEDEK LATZER BARATZ LLP (57) ABSTRACT

A method for determining airborne particulate density, the method including: locating or positioning at least one dark target within a local environment and scanning the local environment using an image capturing component of a user equipment device; constructing a geometric three-dimensional model of the local environment; determining pertinent features within the local environment based on the geometric three-dimensional model; focusing the image capturing component of the user equipment device on the dark target, the user equipment device having quantified location and orientation within the local environment; determining an instantaneous light intensity of the local environment and capturing at least one image of the dark target using the image capturing component of the user equipment device; and analyzing the at least one image in correspondence with the pertinent features, the instantaneous light intensity, and the dark target, and determining therefrom an airborne particulate density in the local environment.

15 Claims, 3 Drawing Sheets

Related U.S. Application Data

(60) Provisional application No. 62/784,589, filed on Dec. 24, 2018.

(56) References Cited

U.S. PATENT DOCUMENTS

| | | | |
|---|---|---|---|
| 2012/0140231 A1* | 6/2012 | Knox | G01N 15/1434 |
| | | | 356/442 |
| 2016/0247375 A1 | 8/2016 | Mills et al. | |
| 2017/0090029 A1* | 3/2017 | Waslowski | G01S 7/497 |
| 2017/0146454 A1* | 5/2017 | Knox | G01S 7/4876 |
| 2017/0276588 A1 | 9/2017 | Knox et al. | |
| 2017/0372216 A1* | 12/2017 | Awiszus | A61F 11/06 |

OTHER PUBLICATIONS

Extended European Search Report for European Patent Application No. 19902069.4 dated Sep. 2, 2022.

* cited by examiner

AIRBORNE PARTICULATE DENSITY DETERMINATION USING STANDARD USER EQUIPMENT

CROSS-REFERENCE TO RELATED APPLICATIONS

This application is a continuation of PCT Application No. PCT/IL2019/051402, filed on Dec. 24, 2019, which claims priority from U.S. Provisional Patent Application No. 62/784,589 filed on Dec. 24, 2018, both are incorporated herein by reference in their entireties.

FIELD OF THE INVENTION

The present invention relates generally to a method for determining airborne particulate density, and more particularly to such methods employing standard user equipment.

BACKGROUND OF THE INVENTION

Prior to setting forth the background of the invention, it may be helpful to set forth definitions of certain terms that will be used hereinafter.

The term 'user equipment' refers generally to any device with computer processing and image capturing functionality, and more preferably to those devices further comprising an illuminating element and wireless communication capability. The device may be a hand-held telephone, a laptop computer, a tablet, or any other appropriate device having the requisite functionality such as a closed circuit television device (CCTV), a light detection and ranging (LIDAR) sensor, wearable cameras such as ones in head mounted display (HMD devices).

The term 'airborne particulates' may be used interchangeably with 'airborne particulate matter' and refers generally to particles of matter retained or transitory within the air with a size range of approximately half to ten microns. These particles may take the form of dust originating from human and animal skin cells, or alternatively may take the form of soot arising from incomplete or inefficient petroleum combustion from an automobile.

The density of airborne particulates in a given area is known to vary significantly over time, generally in correspondence with the prevalence of local airborne polluters, recent weather conditions and/or as a consequence of exacerbating geographical features. Certain locations, such as city center locations or areas with substantially reduced airflow, are furthermore known to have generally higher densities of airborne particulates than counterpart locations in undeveloped or remote areas.

Where and when the local density of airborne particulates becomes sufficiently great, some individuals, such as the elderly or individuals with preexisting vulnerabilities, may become susceptible to respiratory difficulties. In extreme cases, the airborne particulate density may even become so great that it is toxic to breathe for all parties. It is therefore an objective of the invention to provide a convenient means for an ordinary user to determine in real-time the density of airborne particulates in their local vicinity using readily available user equipment. It is a further objective of the invention to provide a means for indicating to a user when the density of particulates exceeds predetermined hazard thresholds, thereby warning said user to take preventative or precautionary action.

SUMMARY OF THE PRESENT INVENTION

The present invention proposes a method for determining airborne particulate density in a local environment. The method may include the following steps: a) locating or positioning at least one dark target within a local environment; b) scanning said local environment using an image capturing component of a user equipment device and constructing a geometric three-dimensional model of said local environment; c) determining pertinent features within said local environment based on said geometric three-dimensional model, said pertinent features including: a relative location of said at least one dark target with respect to said user equipment, and a relative location and intensity of any light sources within said local environment; d) focusing said image capturing component of said user equipment device on said at least one dark target, said user equipment device having quantified location and orientation within said local environment; e) determining an instantaneous light intensity of said local environment and capturing at least one image of said at least one dark target using said image capturing component of said user equipment device, said instantaneous light intensity being obtained prior to capturing said at least one image; and, f) analyzing said at least one image in correspondence with said pertinent features, said instantaneous light intensity, and said dark target, and determining therefrom an airborne particulate density in said local environment.

The present invention further proposes a system for determining airborne particulate density. The system may comprise: one or more dark targets disposed within a local environment; and, a user equipment device comprising a computer processor and an image capturing component; wherein said user equipment device has quantified location and orientation within said local environment and is configured to: a) scan said local environment using said image capturing component and construct a geometric three-dimensional model based on said scans using said computer processor; b) determine, using said computer processor, pertinent features within said local environment based on said geometric three-dimensional model, said pertinent features including: a relative location of said one or more dark targets with respect to said user equipment; and, a relative location and intensity of any light sources within said local environment; c) focus said image capturing component on said one or more dark target; d) determine, using said computer processor, an instantaneous light intensity of said local environment immediately prior to capturing images of said one or more dark target; e) capture, using said image capturing component, at least one image of said one or more dark target; and, f) analyzing, using said computer processor, said at least one image in correspondence with said pertinent features, said instantaneous light intensity, and said dark target, and determining therefrom an airborne particulate density in said local environment.

These and other advantages of the present invention are set forth in detail in the following description.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figure 1:
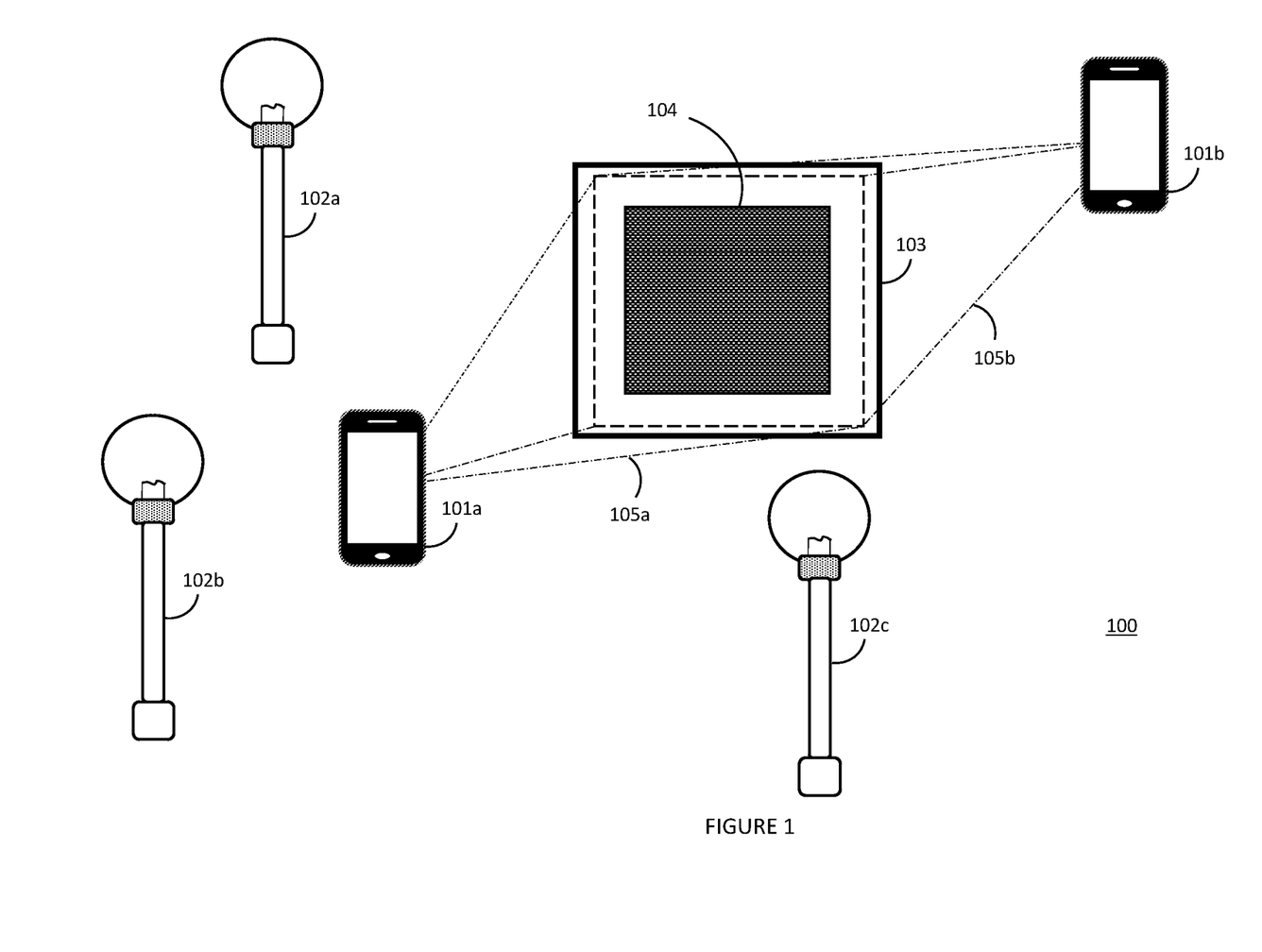
FIG. 1 depicts a non-limiting exemplary approach to scanning a local environment using an image capturing component of a user equipment device in accordance with embodiments of the present invention.
Figure 2:
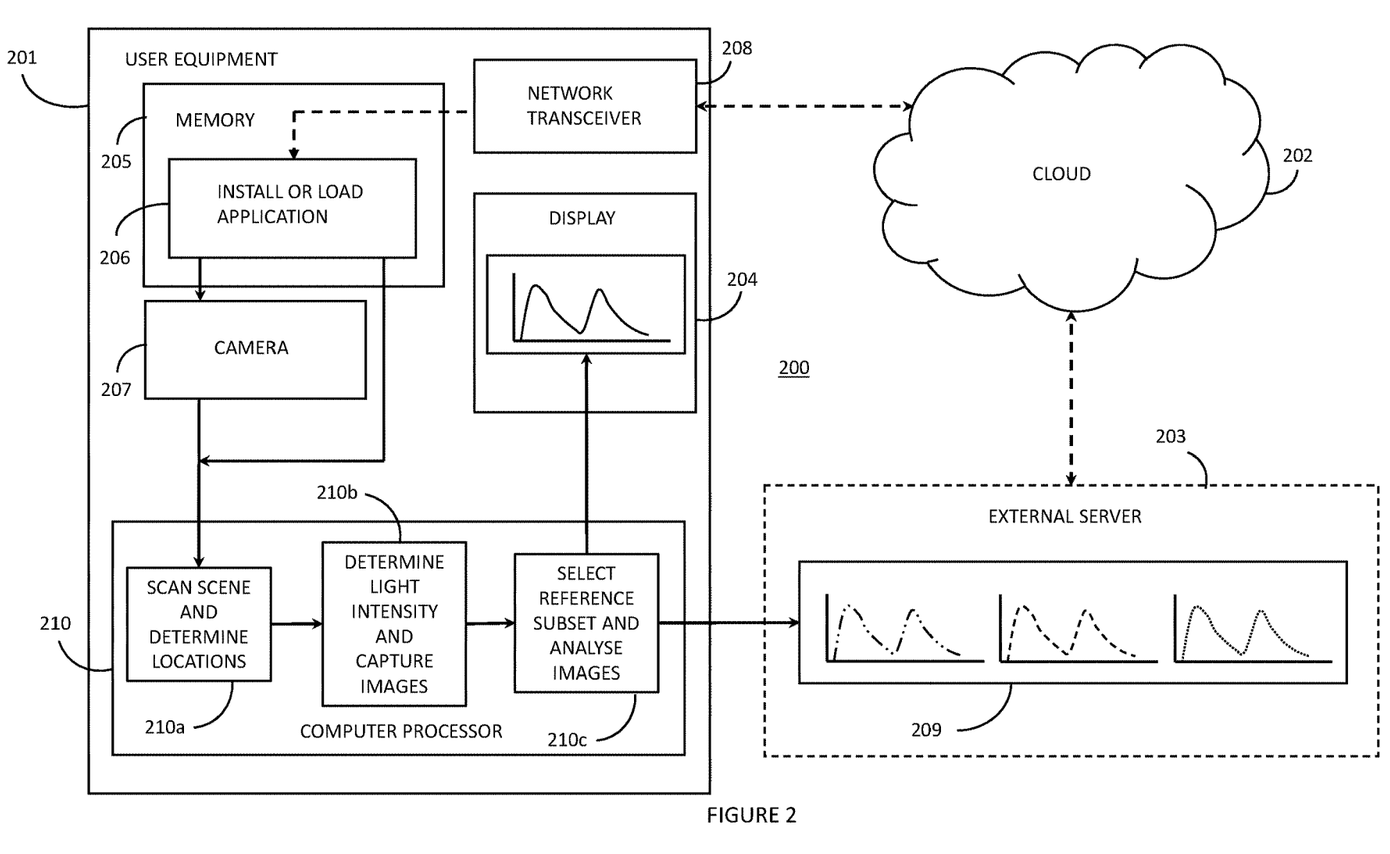
FIG. 2 depicts a non-limiting exemplary arrangement of a standard airborne particulate density determination system in accordance with embodiments of the present invention; and, FIG. 3 is a high-level flowchart illustrating a non-limiting exemplary method in accordance with embodiments of the present invention.

FIG. 1 depicts a non-limiting exemplary approach to scanning a local environment using an image capturing component of a user equipment device in accordance with embodiments of the present invention. A user equipment device 101a, 101b comprising an image capturing and computer processing component may be operated by a user to determine the airborne particulate density in their local environment 100. The user may reside in the local environment 100 or be temporarily or transitorily located in the local environment, such as when commuting to or from a place of work or a local shopping facility. The local environment 100 may be situated in an urban, suburban or remote location, such as in a city center, in a village, or on a farm. In any typical environment, such as in local environment 100, there may be a plurality of different light sources (man-made, or natural) 102*a*, 102*b*, 102*c* each disposed at a different distance and orientation relative to user equipment device 101*a*, 101*b*.

The proposed method for determining a local airborne particulate density entails capturing at least one image with user equipment device 101*a*, 101*b* of at least one dark target 104 positioned or disposed within local environment 100. The at least one dark target 104 may be selectively positioned within the local environment 100 having been adhered or attached to, for example, a plaque or an item of apparel 103. Alternatively, the at least one dark target 104 may be preexisting within the local environment 100 as an integral part or a surface of, for example, local scenery or buildings 103. The at least one dark target 104 may be printed or produced with calibrated or known physical and reflectance properties. Alternatively, the at least one dark target 104 may have determinable physical and reflectance properties using known computational, manual or analytical methods.

The proposed method for determining a local airborne particulate density further entails constructing a three-dimensional geometric model of local environment 100. In order to construct such a three-dimensional geometric model, a user operating the image capturing component of user equipment device 101*a*, 101*b* must first scan or survey their local environment. The scanning or surveying step entails capturing a plurality of images of local environment 100 from a variety of different positions and orientations within said local environment 100. It will be appreciated that a two-dimensional model may be created when capturing images of an environment from a single position and orientation, whereas a three-dimensional model cannot. It will further be appreciated that captured images must be sufficiently continuous and complete to fully construct a geometric model. It is therefore a proposed embodiment of the invention to construct a three-dimensional geometric model of local environment 100 in respect of a user capturing a plurality of primary images 105*a* using user equipment device 101*a* at a first location, and further in respect of said user capturing a plurality of secondary images 105*b* using user equipment device 101*b* at a second location. In some embodiments, user equipment device 101*a* and 101*b* may be the same or independent devices, the images captured by each user equipment device 101*a*, 101*b* being collated to construct said three-dimensional geometric model. In further embodiments, the three-dimensional geometric model of local environment 100 may be constructed in respect of images captured from further positions and orientations within local environment 100.

The location of pertinent or critical features within local environment 100 relative to user equipment device 101*a*, 101*b* may then be determined from the three-dimensional geometric model. Pertinent or critical features in local environment 100 include the location, orientation and/or bearing of dark target 104 relative to user equipment device 101*a*, 101*b*. Pertinent or critical features in local environment 100 also include the location, orientation and/or intensity or illuminance of light sources 102*a*, 102*b*, 102*c* relative to user equipment device 101*a*, 101*b*. It will be appreciated that determining the relative location of pertinent or critical features will necessitate also determining the location and orientation of user equipment device 101*a*, 101*b* within local environment 100. It will further be appreciated that the magnitude of the distance, for example in cubic feet, lying on a line between user equipment device 101*a*, 101*b* and dark target 104 must first be established in order to calculate the density of airborne particulates falling along said line.

FIG. 2 depicts a non-limiting exemplary arrangement 200 of a standard airborne particulate density determination system in accordance with embodiments of the present invention. A standard user equipment device 201 comprises an image capturing component, such as a visual spectrum or infrared camera 207, and a computer processing component 210. The standard user equipment device 201 may further comprise a wireless or wired communication component, such as a network transceiver 208, a non-transitory computer memory component 205, and a display, such as a liquid crystal display screen 204. The non-transitory computer memory component 205 may be prefabricated or preinstalled with computer readable instructions 206 defining the method according to embodiments of the present invention. Alternatively, the non-transitory computer memory component 205 may be patched or updated with the instructions 206 after distribution. Such a patch or update may take the form of an installable or readable application or program distributed over a network, for example distributed over a cloud computing network 202, wherein said network transceiver 208 is operable to transmit requests over said network for said patch or update and to receive related data therefrom.

The computer processing component 210 is operable to implement instructions 206 retained on the non-transitory computer memory component 205. The instructions 206 define method steps according to embodiments of the invention and include at stage 210a scanning the local environment 100 using the image capturing component 207, generating a three-dimensional geometric model of said local environment 100, and determining qualities related to pertinent features located within said local environment 100. The instructions 206 at stage 210b involve focusing the image capturing component 207 at a dark target 104 within the local environment 100, the location, orientation, intensity and/or bearings of the dark target 104 and any light sources 102a, 102b, 102c within local environment 100 relative to user equipment device 201 being known and/or determined from the three-dimensional geometric model. The instructions 206 at stage 210b further involve determining an instantaneous light intensity of said local environment 100 and capturing at least one image of the dark target 104 using the image capturing component 207 of the user equipment device 201, said instantaneous light intensity being obtained prior to capturing the at least one image. The instantaneous light intensity value may be obtained between a tenth and a hundred of a second immediately prior to capturing the at least one image of the dark target 104. The instructions 206 at stage 210c involve analyzing the at least one captured image in correspondence with said pertinent features, said instantaneous light intensity and said calibrated dark target 104 with known physical and reflectance properties, and determining therefrom an airborne particulate density in the local environment 100. As the relative location and the reflectance properties of the dark target 104, the relative location of light sources 102a, 102b, 102c, and the instantaneous light intensity within local environment 100 are known, it is possible to determine the density of airborne particulates therefrom, for example per cubic foot, between said user equipment device 201 and said dark target 104.

In some embodiments, the instructions 206 at stage 210c may further involve selecting, from a reference database, a subset of reference values corresponding to said local environment 100, and comparing the determined airborne particulate density in said local environment 100 with said subset of reference values corresponding to said local environment 100. Reference values may be grouped into subsets denoting standard or typical environments, such as urban, suburban, remote, city center or household environments. The selection may be a manual selection by a user using an input device on the user equipment device 201, for example using a touch screen display 204. Alternatively, the selection may be an automated or computerized selection based on an analysis of features within the captured images. An automated or computerized reference subset selection may, for example, be achieved by running image recognition software on said captured images to characterize buildings or features imaged therein.

In some embodiments, the instructions 206 at stage 210c may additionally include constructing a look-up-table (LUT) separately or collectively for each primary color channel (red, green, blue or RGB). The LUT may contrast the determined airborne particulate density against the reference subset selected from the reference database, and may further be presented in graphical, textual or tabular format on display 204. Data obtained from the captured and analyzed images and/or the LUT may additionally be transmitted, for example via network transceiver 208, to an external server 203 and displayed on an external display 209. The LUT for each color channel RGB may be compared to establish an indication of the level of accuracy to which the airborne particulate density in the local environment 100 has been determined.

In some embodiments, the comparison between the determined and reference values further comprises providing an indication to the user of user equipment device 201 when the airborne particulate density in said local environment 100 exceeds said subset of reference values corresponding to said local environment 100. The indication may include advisory or precautionary action, for example in the form of an audio-visual warning, a textual alert advising the user to administer breathing apparatus, or an automated route adjustment. In yet further embodiments, user equipment device 201 may be operable to receive from said cloud network 202, via said network transceiver 208, data from other users. This data may include airborne particulate density values for locations proximate to said user, and may be assessed by computer processing component 210. In the event that received values indicate potentially hazardous airborne particulate densities in the user's current location or along their route of travel, an indication may similarly be provided to the user of user equipment device 201.

In some embodiments, image capturing component 207 of user equipment device 201 may comprise a lens or aperture. It will be appreciated that this lens or aperture may become occluded or obstructed as a result of smears or the buildup of detritus. The method according to the invention may therefore further include an initial step of cleaning the lens or aperture prior to capturing any images and thereby removing any pre-existing particulates or smears adhered thereto. This step may be manually performed by a user, or may alternatively be automatically administered by the computer processing component 210.

It will be appreciated by those of ordinary skill in the art that the foregoing presupposes that there is at least one continuous external light source 102a, 102b, 102c. In situations where there is no such ambient illumination source, such as where steps according to embodiments of the invention are performed at night and/or outdoors, the user equipment device 201 may be equipped with an illuminating element. The illuminating element may be used to provide a continuous, burst or flashlight source in correspondence with capturing images of said local environment 100. In alternative embodiments, images of dark target 104 may be taken at night in the presence of solely external light sources, such as in the presence of traffic lights. In the case of traffic lights, the intensity and wavelength of light emitted must be obtained or determinable. In situations where there is insufficient light on, for example, a single RGB channel (e.g., the blue channel in the presence of traffic lights), a complete comparison in respect of all three primary color channels may not be possible. In such circumstances, computer processing component 210 may be operable to proceed with airborne particulate density determination in respect of fewer channels. This may be supplemented at a later point if, for example, a new or additional channel (i.e., a new wavelength of light) subsequently becomes available.

Figure 3:
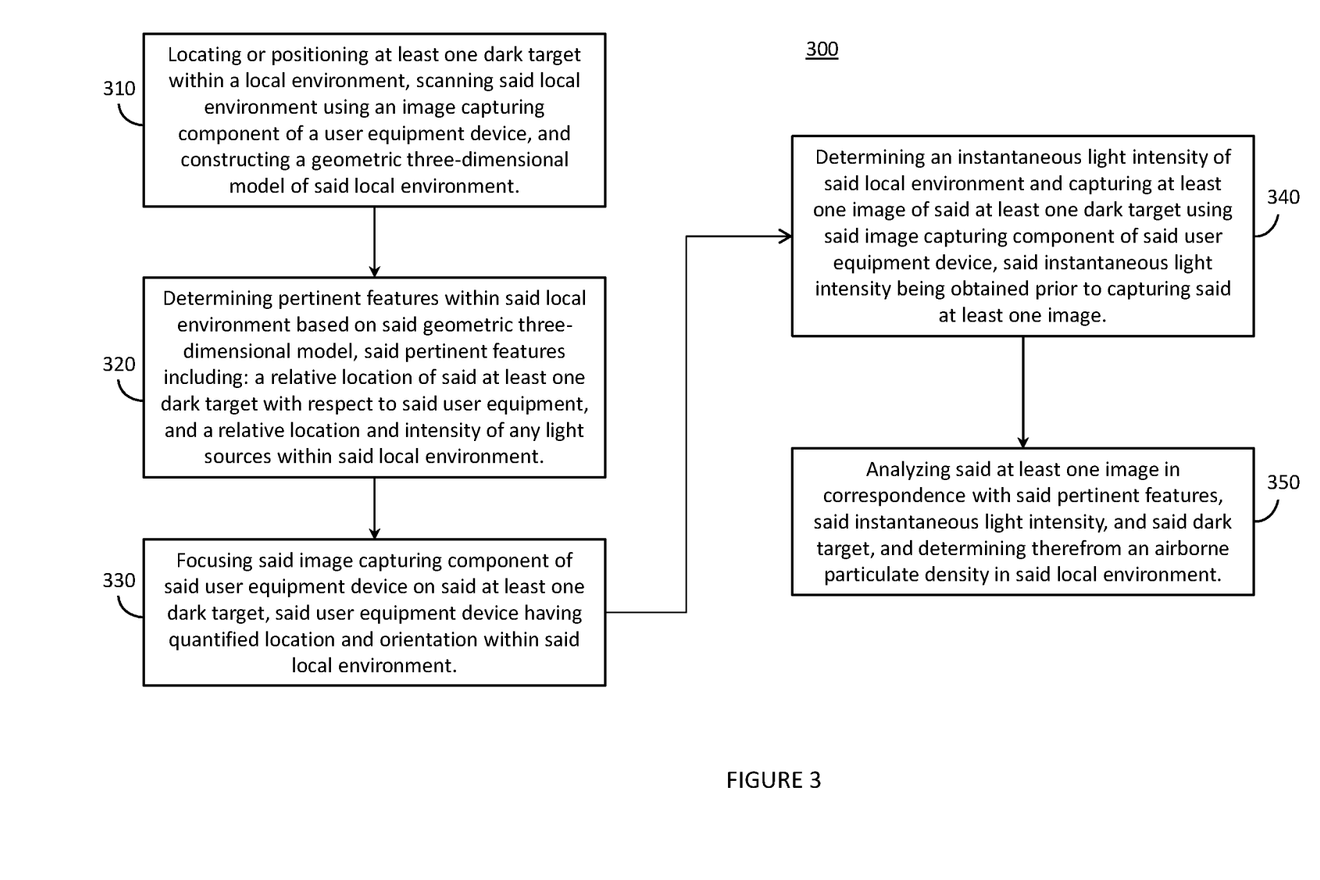

FIG. 3 is a high level flowchart illustrating a non-limiting exemplary method 300 in accordance with embodiments of the present invention. The method may include the steps of: locating or positioning at least one dark target within a local environment, scanning said local environment using an image capturing component of a user equipment device, and constructing a geometric three-dimensional model of said local environment 310; determining pertinent features within said local environment based on said geometric three-dimensional model, said pertinent features including: a relative location of said at least one dark target with respect to said user equipment, and a relative location and intensity of any light sources within said local environment 320; focusing said image capturing component of said user equipment device on said at least one dark target, said user equipment device having quantified location and orientation within said local environment 330; determining an instantaneous light intensity of said local environment and capturing at least one image of said at least one dark target using said image capturing component of said user equipment device, said instantaneous light intensity being obtained prior to capturing said at least one image 340; and, analyzing said at least one image in correspondence with said pertinent features, said instantaneous light intensity, and said dark target, and determining therefrom an airborne particulate density in said local environment 350.

According to some embodiments of the invention, the method may further comprise the steps of: g) selecting, from a reference database, a subset of reference values corresponding to said local environment; and, h) comparing said airborne particulate density in said local environment with said subset of reference values corresponding to said local environment.

According to some embodiments of the invention, the user equipment device may be further configured to: g) select, from a reference database using said computer processor, a subset of reference values corresponding to said local environment; and, h) compare, using said computer processor, said airborne particulate density in said local environment with said subset of reference values corresponding to said local environment.

According to some embodiments of the invention, the comparison may comprise constructing a look-up-table separately for each primary color channel (RGB).

According to some embodiments of the invention, the comparison may further comprise providing an indication to a user of said user equipment device when said airborne particulate density in said local environment exceeds said subset of reference values corresponding to said local environment.

According to some embodiments of the invention, the indication may comprise one or more of: an audio-visual warning; a textual alert advising the user to administer breathing apparatus; and, an automated route adjustment.

According to some embodiments of the invention, the image capturing component of the user equipment device may comprise a lens or aperture, wherein any pre-existing particulates adhered to said lens or aperture are removed prior to initiating said steps.

According to some embodiments of the invention, the quantified location and orientation of the user equipment device within the local environment may be calculated based upon data from one or more sensor component of said user equipment device.

According to some embodiments of the invention, the sensor component may comprise one or more of: a global positioning system (GPS) sensor; a gyroscope, an accelerometer; a magnetometer; a proximity sensor; an ambient light sensor; and, a microphone.

According to some embodiments of the invention, the image capturing component may comprise a lens or aperture, wherein any pre-existing particulates adhered to said lens or aperture are removed prior operating said user equipment device.

According to some embodiments of the invention, the quantified location and orientation of the user equipment device within the local environment is calculated, using the computer processor, based upon data from one or more sensor component of the user equipment device, wherein the one or more sensor component comprises: a global positioning system (GPS) sensor; a gyroscope, an accelerometer; a magnetometer; a proximity sensor; an ambient light sensor; and, a microphone.

According to some embodiments of the invention, the dark target may have substantially black, brown, blue and/or green color appearance parameters (e.g., a light brown, dark blue or dark green hue).

In order to implement the method according to embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, JavaScript Object Notation (JSON), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for determining airborne particulate density, said method comprising the steps of:
   a) locating or positioning at least one dark target within a local environment;
   b) scanning said local environment using an image capturing component of a user equipment device and constructing a geometric three-dimensional model of said local environment;
   c) determining pertinent features within said local environment based on said geometric three-dimensional model, said pertinent features including: a relative location of said at least one dark target with respect to said user equipment; and, a relative location and intensity of any light sources within said local environment;
   d) focusing said image capturing component of said user equipment device on said at least one dark target, said user equipment device having quantified location and orientation within said local environment;
   e) determining an instantaneous light intensity of said local environment and capturing at least one image of said at least one dark target using said image capturing component of said user equipment device, said instantaneous light intensity being obtained prior to capturing said at least one image; and,
   f) analyzing said at least one image in correspondence with said pertinent features, said instantaneous light intensity, and said dark target, and determining therefrom an airborne particulate density in said local environment.

2. The method according to claim 1, further comprising the steps of:
   g) selecting, from a reference database, a subset of reference values corresponding to said local environment; and,
   h) comparing said airborne particulate density in said local environment with said subset of reference values corresponding to said local environment.

3. The method according to claim 2, wherein said comparison comprises constructing a look-up-table separately for each primary color channel (RGB).

4. The method according to claim 2, wherein said comparison further comprises providing an indication to a user of said user equipment device when said airborne particulate density in said local environment exceeds said subset of reference values corresponding to said local environment.

5. The method according to claim 4, wherein said indication comprises one or more of: an audio-visual warning; a textual alert advising the user to administer breathing apparatus; and, an automated route adjustment.

6. The method according to claim 1, wherein said image capturing component of said user equipment device comprises a lens or aperture, and wherein any pre-existing particulates adhered to said lens or aperture are removed prior to initiating said steps.

7. The method according to claim 1, wherein said quantified location and orientation of said user equipment device within said local environment is calculated based upon data from one or more sensor component of said user equipment device.

8. The method according to claim 7, wherein said sensor component comprises one or more of: a global positioning system (GPS) sensor; a gyroscope, an accelerometer; a magnetometer; a proximity sensor; an ambient light sensor; and, a microphone.

9. A system for determining airborne particulate density, the system comprising:
   one or more dark targets disposed within a local environment; and,
   a user equipment device comprising a computer processor and an image capturing component;
   wherein said user equipment device has quantified location and orientation within said local environment and is configured to:
   a) scan said local environment using said image capturing component and construct a geometric three-dimensional model based on said scans using said computer processor;
   b) determine, using said computer processor, pertinent features within said local environment based on said geometric three-dimensional model, said pertinent features including: a relative location of said one or more dark targets with respect to said user equipment; and, a relative location and intensity of any light sources within said local environment;
   c) focus said image capturing component on said one or more dark target;
   d) determine, using said computer processor, an instantaneous light intensity of said local environment immediately prior to capturing images of said one or more dark target;
   e) capture, using said image capturing component, at least one image of said one or more dark target; and,
   f) analyzing, using said computer processor, said at least one image in correspondence with said pertinent features, said instantaneous light intensity, and said dark target, and determining therefrom an airborne particulate density in said local environment.

10. The system according to claim 9, wherein said user equipment device is further configured to:

g) select, from a reference database using said computer processor, a subset of reference values corresponding to said local environment; and, h) compare, using said computer processor, said airborne particulate density in said local environment with said subset of reference values corresponding to said local environment.

11. The system according to claim 10, wherein said comparison comprises constructing a look-up-table separately for each primary color channel (RGB).

12. The system according to claim 10, wherein said comparison further comprises providing an indication to a user of said user equipment device when said airborne particulate density in said local environment exceeds said subset of reference values corresponding to said local environment.

13. The system according to claim 12, wherein said indication comprises one or more of: an audio-visual warning; a textual alert advising the user to administer breathing apparatus; and, an automated route adjustment.

14. The system according to claim 9, wherein said image capturing component comprises a lens or aperture, and wherein any pre-existing particulates adhered to said lens or aperture are removed prior operating said user equipment device.

15. The system according to claim 9, wherein said quantified location and orientation of said user equipment device within said local environment is calculated, using said computer processor, based upon data from one or more sensor component of said user equipment device, wherein said one or more sensor component comprises: a global positioning system (GPS) sensor; a gyroscope, an accelerometer; a magnetometer; a proximity sensor; an ambient light sensor; and, a microphone.

\* \* \* \* \*